United States Patent
Dane et al.

(10) Patent No.: US 9,518,519 B2
(45) Date of Patent: Dec. 13, 2016

(54) TRANSIENT CONTROL OF EXHAUST GAS RECIRCULATION SYSTEMS THROUGH MIXER CONTROL VALVES

(71) Applicant: Cummins Inc., Columbus, IN (US)

(72) Inventors: Marten H. Dane, Columbus, IN (US); John C. Wall, Columbus, IN (US); Wayne A. Eckerle, Columbus, IN (US)

(73) Assignee: Cummins Inc., Columbus, IN (US)

( * ) Notice: Subject to any disclaimer, the term of this patent is extended or adjusted under 35 U.S.C. 154(b) by 29 days.

(21) Appl. No.: 14/532,391

(22) Filed: Nov. 4, 2014

(65) Prior Publication Data

US 2015/0121851 A1    May 7, 2015

Related U.S. Application Data

(60) Provisional application No. 61/899,491, filed on Nov. 4, 2013.

(51) Int. Cl.

| | |
|---|---|
| *F01N 3/00* | (2006.01) |
| *F02M 25/06* | (2016.01) |
| *F02D 41/00* | (2006.01) |
| *F02D 21/08* | (2006.01) |
| *F02B 29/04* | (2006.01) |

(52) U.S. Cl.
CPC .......... *F02D 41/0077* (2013.01); *F02D 21/08* (2013.01); *F02D 41/005* (2013.01); *F02D 41/0072* (2013.01); *F02M 26/21* (2016.02); *F02M 26/37* (2016.02); *F02M 26/38* (2016.02); *F02M 26/43* (2016.02); *F02B 29/0425* (2013.01); *F02B 29/0437* (2013.01); *F02M 26/05* (2016.02); *F02M 26/28* (2016.02); *F02M 26/47* (2016.02); *F02M 26/71* (2016.02); *Y02T 10/47* (2013.01)

(58) Field of Classification Search
USPC .......................................... 60/278, 285, 299
See application file for complete search history.

(56) References Cited

U.S. PATENT DOCUMENTS

| | | | |
|---|---|---|---|
| 4,024,847 A * | 5/1977 | Koganemaru | F02D 41/0065 123/568.2 |
| 4,635,609 A | 1/1987 | Seppen et al. | |
| 5,398,653 A | 3/1995 | Merritt | |
| 5,517,976 A | 5/1996 | Bachle et al. | |
| 6,286,489 B1 | 9/2001 | Bailey | |
| 6,401,699 B1 | 6/2002 | Persson et al. | |

(Continued)

FOREIGN PATENT DOCUMENTS

| | | |
|---|---|---|
| EP | 1493907 B1 | 2/2007 |
| GB | 2458968 A | 10/2009 |

(Continued)

*Primary Examiner* — Thomas Denion
*Assistant Examiner* — Diem Tran
(74) *Attorney, Agent, or Firm* — Taft, Stettinius & Hollister LLP (57) ABSTRACT

Systems, methods and techniques for exhaust gas recirculation are provided. The system includes controlling the mixing of exhaust flow from at least one cylinder of an engine with air in an air intake system prior to combustion in response to an EGR fraction deviation condition. The exhaust flow from the at least one cylinder is accumulated prior to mixing and distributed into the intake air system in a controlled manner to mitigate or prevent the EGR flow from deviating from an expected EGR fraction.

21 Claims, 4 Drawing Sheets

(56) References Cited

U.S. PATENT DOCUMENTS

| | | | |
|---|---|---|---|
| 6,763,708 B2 | 7/2004 | Ting et al. | |
| 6,877,492 B1 | 4/2005 | Osterwald | |
| 6,899,090 B2 | 5/2005 | Arnold | |
| 6,973,785 B2 | 12/2005 | Umehara et al. | |
| 7,043,914 B2 | 5/2006 | Ishikawa | |
| 7,287,378 B2 * | 10/2007 | Chen | F02M 25/0732 123/568.12 |
| 7,389,770 B2 | 6/2008 | Bertilsson et al. | |
| 7,721,541 B2 | 5/2010 | Roberts, Jr. et al. | |
| 7,891,345 B2 * | 2/2011 | Pierpont | F02M 25/0722 123/568.12 |
| 7,975,478 B2 | 7/2011 | Zielke et al. | |
| 8,146,572 B2 | 4/2012 | Macfarlane | |
| 8,453,431 B2 * | 6/2013 | Wang | F02D 41/00 60/274 |
| 2006/0037578 A1 | 2/2006 | Nakamura | |
| 2006/0112940 A1 | 6/2006 | Roberts, Jr. et al. | |
| 2007/0144170 A1 | 6/2007 | Griffith | |
| 2007/0193270 A1 | 8/2007 | Roozenboom et al. | |
| 2009/0199825 A1 | 8/2009 | Piper et al. | |
| 2009/0308070 A1 | 12/2009 | Alger, II et al. | |
| 2010/0071365 A1 | 3/2010 | Laermann et al. | |
| 2010/0217503 A1 | 8/2010 | Leone et al. | |
| 2010/0282222 A1 | 11/2010 | Ide et al. | |
| 2011/0253113 A1 | 10/2011 | Roth et al. | |
| 2012/0023937 A1 | 2/2012 | Styles et al. | |
| 2012/0048244 A1 | 3/2012 | Hayman et al. | |
| 2012/0060497 A1 | 3/2012 | Roth | |
| 2012/0204844 A1 | 8/2012 | Gingrich et al. | |
| 2012/0204845 A1 | 8/2012 | Gingrich et al. | |
| 2012/0260894 A1 | 10/2012 | Hayman | |
| 2012/0285163 A1 | 11/2012 | Hayman et al. | |
| 2012/0285427 A1 | 11/2012 | Hayman et al. | |

FOREIGN PATENT DOCUMENTS

| | | |
|---|---|---|
| WO | 2010116064 A1 | 10/2010 |
| WO | 2011025586 A1 | 3/2011 |
| WO | 2012030816 A2 | 3/2012 |
| WO | 2012039732 A1 | 3/2012 |

* cited by examiner

Fig. 4

TRANSIENT CONTROL OF EXHAUST GAS RECIRCULATION SYSTEMS THROUGH MIXER CONTROL VALVES

CROSS-REFERENCE TO RELATED APPLICATION

The present application claims the benefit of the filing date of U.S. Provisional Application No. 61/899,491 filed on Nov. 4, 2013, which is incorporated herein by reference in its entirety.

FIELD OF THE INVENTION

The present invention relates generally to exhaust gas recirculation in internal combustion engines, and more particularly is concerned with systems, methods, and devices for control of exhaust gas recirculation mixing with intake air flow in response to transient conditions that occur during the operation of an internal combustion engine.

BACKGROUND

The production of noxious nitrogen oxides ($NO_x$) by internal combustion engines which pollute the atmosphere are undesirable and in many cases are controlled by regulations established by governmental entities. Furthermore, spark ignited engines exhibit abnormal combustion phenomena called "knock", which occurs when combustion reactions in the unburned zone initiate rapid uncontrolled combustion prior to the arrival of the propagating flame front of a homogenous combustion process. One method for controlling knock includes increasing the flame propagation rate by, for example, improving the mixture homogeneity or by increasing the turbulence level induced by organized charge motion.

One method for limiting or controlling the combustion temperature of the engine and thus reduce $NO_x$ emissions has been to recirculate a portion of the exhaust gas back to the engine air intake to lower the oxygen content in the charge flow. This reduces the combustion temperature of the intake charge flow and in turn reduces the amount of $NO_x$ formation during combustion due to lower flame temperatures. In order to recirculate exhaust gas, an exhaust gas recirculation (EGR) line that connects the exhaust manifold to the intake air supply line is provided. One EGR method to increase the flame propagation rate is to have one or more cylinders dedicated to providing EGR flow to the engine intake. When the EGR line is connected with one or more dedicated cylinders, the engine acts as a positive displacement pump to drive the EGR flow, eliminating pumping losses in transporting exhaust to the intake system and allowing a wide range of engine out nitrous oxide emissions to be achieved. Also, since the exhaust from the dedicated cylinder does not escape the engine, it is possible to have alternative combustion processes with the dedicated cylinder(s), such as running the dedicated cylinder(s) in a rich combustion condition to generate a favorable species like hydrogen. In addition, a variable geometry turbocharger is not required to drive EGR flow, facilitating meeting of target air-fuel ratios.

However, these EGR arrangements come at the cost of a loss of control over the system, including a loss of control of the EGR fraction during low load and transient conditions. When nominal cylinders are dedicated to providing EGR, and standard fueling and controls are applied, the EGR fraction provided by the dedicated cylinders is limited to the simple ratio of the number of dedicated EGR cylinders to the total number of cylinders. For example, an engine with one cylinder dedicated to EGR and four cylinders total will operate at a 25% EGR fraction if all of the cylinders are operated in the same manner. However, during transient conditions the EGR fraction due to volume filling dynamics in the dedicated EGR flow path can vary significantly from the EGR fraction. In addition, in certain steady state conditions, the volumetric efficiency changes with load can cause deviations of the EGR fraction from its expected value. When the EGR fraction decreases from its expected value, knock conditions can be developed. When the EGR fraction increases from its expected value, cylinder misfire and combustion instability can result. Therefore, further technological developments are desirable in this area.

SUMMARY

Embodiments include unique methods for mixing EGR flow with intake air for an internal combustion engine in response to an EGR fraction deviation condition resulting from, for example, transient engine operating conditions. Additional embodiments include unique systems for mixing control of the EGR flow with intake air for an internal combustion engine during an EGR fraction deviation condition. Other embodiments include unique devices for mixing EGR flow with intake air for an internal combustion engine. In one aspect, the methods, systems and devices are employed in EGR systems having EGR flow accumulated from one or more cylinders that primarily, and in some embodiments exclusively, provide exhaust for exhaust gas recirculation. Further embodiments, forms, objects, features, advantages, aspects, and benefits shall become apparent from the following description and drawings.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention illustrated therein being contemplated as would normally occur to one skilled in the art to which the invention relates.

Figure 1:
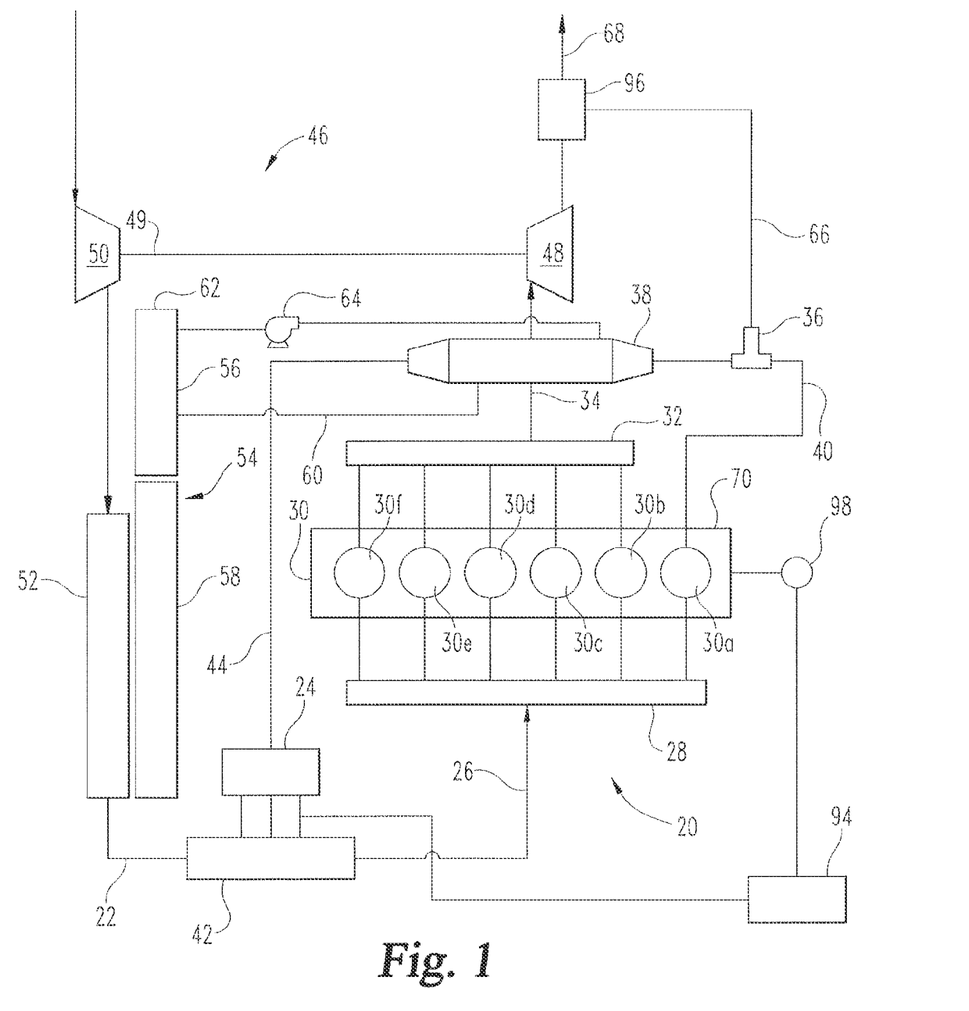
FIG. 1 is a schematic illustration of a system for mixing EGR flow with an intake flow for an internal combustion engine.

With reference to FIG. 1, a system 20 for controlling EGR flow is illustrated in schematic form. System 20 includes an intake system with an inlet air supply conduit 22, an accumulator 24 that provides a storage volume for exhaust gases and controlled release of the exhaust gases for mixing of EGR flow with intake air, an intake manifold supply conduit 26, and an engine intake manifold 28 connected to an engine 30. System 20 includes an exhaust system that includes an engine exhaust manifold 32, an exhaust conduit 34, a turbocharger 46, and an aftertreatment system 96 that may include one or more aftertreatment devices. System 20 also includes an EGR system with a recirculating exhaust gas supply conduit 40 that extends from and is in flow communication with at least one of the combustion chambers 30a-30f of engine 30 that provides primary EGR flow, and in other embodiments exclusively provides EGR flow, through a conduit that is separate from exhaust flow conduit 34.

The term primary EGR flow, as utilized herein, includes an EGR arrangement wherein, during at least certain operating conditions, the entire exhaust output of one or more cylinders, but less than all of the cylinders, is recirculated to the engine intake, and the cylinder or cylinders providing the primary EGR flow is or are primary EGR cylinder(s). A primary EGR cylinder typically, at least during primary EGR operation, includes exhaust divided from one or more of the remaining cylinders that are not primary EGR cylinders.

The EGR system also includes an EGR cooler 38 and an EGR flow valve 36 that allows the flow of exhaust from the primary EGR cylinder/combustion chamber to EGR cooler 38 to be varied. Embodiments without EGR valve 36 are also contemplated so that the exhaust flow from primary EGR cylinder is always provided as EGR flow. EGR flow continues from EGR cooler 38 through an EGR conduit 44 to accumulator 24 where EGR flow is temporarily stored and then released for distribution and mixing with intake air flow in air supply conduit 22 at a mixing location 42. Accumulator 24 includes at least one inlet to receive EGR flow from EGR conduit 44 and a plurality of outlets that connect accumulator 24 with mixing location 42. In the illustrated embodiment, mixing location 42 is in intake conduit 22, but could be at intake manifold 28.

EGR conduit 44 is flow coupled to mixing location 42 through accumulator 24 and the inlet air supply is flow coupled to mixing location 42 through inlet air supply conduit 22. A charge flow is created by combining inlet air and recirculated exhaust gas at mixing location 42. The charge flow created at mixing location 42 is flow coupled to engine intake manifold 28 through intake manifold supply conduit 26. At least one of the cylinders 30a of engine 30 is flow coupled to EGR cooler 38 through recirculating exhaust gas supply conduit 40 and EGR valve 36, and EGR cooler 38 is flow coupled to accumulator 24 through EGR conduit 44. EGR cooler 38 may further be connected to a radiator system 54 including a low temperature radiator 56 and a high temperature radiator 58. A coolant return line 60 extends from EGR cooler 38 to radiator system 54 and a coolant supply line 62 supplies coolant from radiator system 54 to EGR cooler 38. Coolant supply line 62 may include a pump 64 to provide circulation of coolant flow. In another embodiment, the coolant system for the EGR flow may utilize only one radiator, such as radiator 58.

In one embodiment, exhaust conduit 34 is flow coupled to exhaust manifold 32, and may also include one or more intermediate flow passages, conduits or other structures. Exhaust conduit 34 extends to a turbine 48 of turbocharger 46. Turbocharger 46 may be any suitable turbocharger known in the art, including variable-geometry turbine turbochargers and waste-gated turbochargers. Turbocharger 46 may also include multiple turbochargers. Turbine 48 is connected via a shaft 49 to a compressor 50 flow coupled to inlet air supply conduit 22. Inlet air supply conduit 22 may include a charge air cooler 52 downstream from compressor 50 and upstream from mixing location 42. In another embodiment, inlet air supply conduit 22 may include a charge air cooler 52 downstream from mixing location 42. The components illustrated in FIG. 1 are not exclusive of all components and/or arrangements that may be included in system 20. Furthermore, one or more of the illustrated components in system 20 may be omitted.

In operation of system 20, fresh air is supplied through inlet air supply conduit 22. The supplied air can be filtered, unfiltered, and/or conditioned in any known manner. The air supply system may include components configured to introduce charge air into engine 30, and may include an induction valve (not shown), one or more compressors 50, and charge air cooler 52. The induction valve may be connected upstream or downstream of compressor 50 via a fluid passage and configured to regulate a flow of atmospheric air to engine 30. Compressor 50 may be a fixed or variable geometry compressor configured to receive air from the induction valve and compress the air to a predetermined pressure level before the air enters engine 30. Charge air cooler 52 may be disposed within inlet air supply conduit 22 between engine 30 and compressor 50, and embody, for example, an air-to-air heat exchanger, an air-to-liquid heat exchanger, or a combination of both to facilitate the transfer of thermal energy to or from the compressed air directed into engine 30.

In one embodiment, ambient air is pressurized with compressor 50 and sent through charge air cooler 52 before delivery to mixing location 42. When provided, EGR valve 36 is operable to proportionally control recirculation of all or a portion of exhaust gas from at least one of the cylinders 30a-30f of engine 30 to accumulator 24. EGR valve 36 may be actuatable to control the proportion of exhaust gas that is recirculated, or may simply be an on/off type valve with proportion control provided exclusively by accumulator 24. In embodiments in which only a portion of exhaust gas is recirculated, an EGR flow measurement sensor or intake oxygen measurement sensor may be provided to estimate the amount or fraction of EGR flow that is inducted into cylinders 30a-30f. In still other embodiments, there is no EGR valve 36 and EGR flow is provided continuously during engine operation. The EGR flow through accumulator 24 is distributed and mixed with inlet air received from inlet air supply conduit 22 at mixing location 42. The air-exhaust gas mixture is then supplied as a charge flow to engine 30 through engine intake manifold 28 and intake manifold supply conduit 26.

Exhaust gas which is not recirculated through EGR valve 36 continues through an exhaust conduit 66 to an outlet conduit 68 downstream of turbine 48 and then, along with exhaust gas from exhaust conduit 34, is outlet through an aftertreatment system 96 to a tail pipe or other structure to the atmosphere. The exhaust system along outlet conduit 68 may include components configured to direct exhaust from engine 30 to the atmosphere. Specifically, the exhaust system may include aftertreatment system 96 including, for example, oxidation devices (DOC), particulate removing devices (DPF, CDPF), constituent absorbers or reducers (SCR, AMOX, LNT), three-way catalysts for stoichiometric spark ignited engines, attenuation devices (mufflers), controllers, etc., if desired.

In operation, engine 30 produces a non-EGR exhaust stream into exhaust conduit 34 and receives a charge flow from intake manifold supply conduit 26 comprising an intake air stream from inlet air supply conduit 22 mixed with an EGR stream from accumulator 24. The engine 30 is fluidly coupled to intake manifold 28 and exhaust manifold 32, and the EGR stream passes from the one or more primary EGR cylinder(s), such as primary EGR cylinder 30a, through EGR valve 36. The recirculating exhaust gas supply conduit 40 is illustrated as exiting the primary EGR cylinder 30a, but may include one or more branch lines to receive exhaust from one or more of the other cylinders 30b-30f that also primarily provide recirculating exhaust gas flow.

In one embodiment, engine 30 is a turbocharged diesel engine. In still other embodiments, engine 30 is a spark-ignited engine. It should be understood that a variety of other types of engines and combustion devices are contemplated by additional embodiments including non-turbocharged diesel engines as well as engines which combust fuels other than diesel fuel. Engine 30 may include an engine block 70 that at least partially defines a plurality of cylinders 30a-30f. A piston (not shown) may be slidably disposed within each cylinder 30a-30f to reciprocate between a top-dead-center position and a bottom-dead-center position, and a cylinder head (not shown) may be associated with each cylinder 30a-30f. Cylinder 30a-30f, the piston, and the cylinder head form a combustion chamber. In the illustrated embodiment, engine 30 includes six such combustion chambers. However, it is contemplated that engine 30 may include a greater or lesser number of cylinders and combustion chambers and that cylinders and combustion chambers may be disposed in an "in-line" configuration, a "V" configuration, or in any other suitable configuration.

In one embodiment, engine 30 is a four stroke engine. That is, for each complete engine cycle (i.e., for every two full crankshaft rotations), each piston of each cylinder 30a-30f moves through an intake stroke, a compression stroke, a combustion or power stroke, and an exhaust stroke. Thus, during each complete cycle for the depicted six cylinder engine, there are six strokes during which air is drawn into individual combustion chambers from intake manifold supply conduit 26, five strokes during which exhaust is expelled from individual cylinders 30b-30f to exhaust conduit 34, and one exhaust stroke during which exhaust gas is expelled from cylinder 30a to recirculating exhaust gas supply conduit 40. These strokes correspond with pulsations of air and exhaust within the respective systems.

Figure 2:
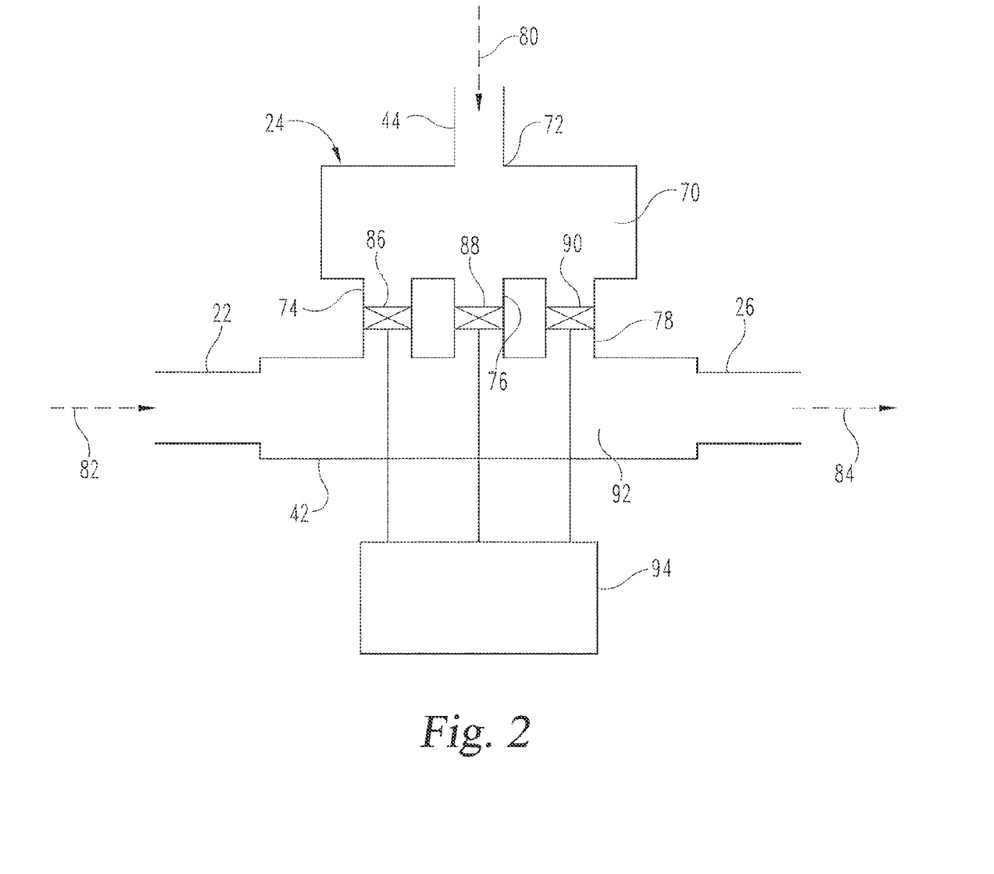
FIG. 2 is a schematic illustration of an accumulator in the system of FIG. 1 that connects an EGR system to an intake system.

As can be seen in FIG. 2, one embodiment of accumulator 24 is shown. Accumulator 24 includes a housing that defines a storage volume 70 having an inlet 72 fluidly connected to EGR cooler 38 with EGR conduit 44 to receive EGR flow 80. Accumulator 24 also includes a plurality of outlets 74, 76, 78 fluidly connected to mixing location 42, which also receives an inlet air flow 82 from inlet air conduit 22. Outlets 74, 76, 78 each include a flow control member 86, 88, 90, respectively, to prevent or allow a controlled amount of EGR flow 80 through the respective outlet 74, 76, 78 into mixing location 42 at spaced locations along the length of mixing location 42. EGR flow 80 mixes with inlet air flow 82 to provide a charge flow 84 in which EGR flow is combined with inlet air flow and provided to or at intake manifold 28 from intake manifold supply conduit 26.

Outlets 74, 76, 78 each include a respective length of pipe or conduit that connects storage volume 70 to mixing location 42. Each outlet pipe houses a flow control member 86, 88, 90 that is movable between open and closed positions, on and off positions, and/or at one or more positions intermediate the open and closed positions, that vary the opening size of the respective outlets 74, 76, 78 into mixing location 42. Flow control members 86, 88, 90 can be butterfly valves, gate valves, ball valves, one-way flow control valves, continuously variable valves, or any suitable flow control device. The opening size can be varied, ranging from a no flow condition through the respective outlet to a full flow condition through the respective outlet, so that one, two or all of the outlets 74, 76, 78 to provide a desired flow rate and distribution of EGR flow 80 from storage volume 70 into mixing location 42. Outlets 74, 76, 78 and the EGR flow therethrough are arranged in perpendicular orientation to the direction of inlet air flow 82 and parallel to the direction of EGR flow 80 such that the pressures and the flow rates of exhaust passing through flow control members 86, 88, 90 may be maintained substantially equal when flow control members 86, 88, and 90 are each completely opened. Each of outlets 74, 76, 78 may direct parallel flows of EGR flow 80 into a mixing chamber 92 defined by mixing location 42 in a direction substantially orthogonal to or, in other embodiments, the same, opposing, or oblique directions, as the inlet air flow 82 through fluid mixing chamber 92.

As can also be seen in FIG. 2, outlets 74, 76, 78 may be separated from each other along a length direction of mixing location 42 such that EGR flow 80 is substantially evenly distributed within the charge flow to each cylinder 30a-30f during operation of engine 30. As described above with respect to a six cylinder engine, during a full engine cycle, six pulses of air may be drawn from intake manifold supply conduit 26 by cylinders 30a-30f, and five pulses of exhaust may be directed from cylinders 30b-30f into exhaust conduit 34 and one pulse of exhaust may be directed into EGR conduit 44 from primary EGR cylinder 30a. Volume 70 accumulates EGR flow 80 therein so that a continuous supply of exhaust gas is available for admission into mixing chamber 92 at mixing location 42 through outlets 74, 76, 78. In one embodiment, one or two of flow control members 86, 88, 90 are closed while the remaining flow control members are open, or all flow control members 74, 76, 78 are partially closed after engine startup until storage volume 70 accumulates a sufficient quantity of exhaust gas to provide a continuous or readily available supply of EGR flow.

To provide substantially equal distribution of the EGR flow 80 relative to inlet air flow 82, the pulses of recirculated exhaust gas should be substantially equally interspersed within the pulses of air. In the embodiment of FIG. 2, the volume 70 is sized as a portion or fraction of the engine total displacement, which is dependent on the number of cylinders acting as EGR cylinders to generate EGR flow 80, also referred to as the expected EGR fraction. In the example of FIG. 1, the total number of cylinders 30b-30f included within engine 30 contributing to engine displacement is five, the number of cylinders 30a contributing exhaust to the EGR fraction provided by EGR flow 80 is one, and the number of outlets of accumulator 24 is three. Thus, the volume 70 is sized to accumulate sufficient recirculated exhaust gas from cylinder 30a to provide a continuous supply of EGR flow at the expected EGR fraction for the air pulses of the six cylinders 30a-30f. In this example, each pulse of exhaust from the single contributing cylinder 30a is accumulated in volume 70 and subsequently divided by flow control members 86, 88, 90 of outlets 74, 76, 78 into one, two, or three smaller pulses of the same or varying size that are dispersed between or within each pulse of air drawn into cylinders 30a-30f. Since the storage volume 70 provides a constant source of recirculated exhaust gas to maintain the EGR fraction, EGR flow 80 is contributed to each pulse of air drawn into the respective cylinders 30a-30f even if primary EGR cylinder 30a is not generating an exhaust pulse.

In certain embodiments, the system 20 includes a controller 94 structured to perform certain operations to control a primary EGR engine. The controller 94 is connected to flow control members 86, 88, 90 and to a plurality of other engine condition sensors shown schematically as sensor 98. The engine condition sensors 98 may include, but are not limited to, sensors which monitor engine position, engine speed, manifold static pressure, mass air flow into the manifold, engine temperature, air temperature, cam shaft position (inlet and exhaust), inlet manifold tuning valves, barometric pressure, EGR amount, VGT position, torque demand, gear position, etc.

In certain embodiments, the controller 94 forms a portion of a processing subsystem including one or more computing devices having memory, processing, and communication hardware. The controller 94 may be a single device or a distributed device, and the functions of the controller 94 may be performed by hardware or instruction encoded on computer readable medium. The controller 94 may be included within, partially included within, or completely separated from an engine controller (not shown). The controller 94 is in communication with any sensor or actuator throughout the system 20, including through direct communication, communication over a datalink, and/or through communication with other controllers or portions of the processing subsystem that provide sensor and/or actuator information to the controller 94.

In certain embodiments, the controller 94 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Figure 3:
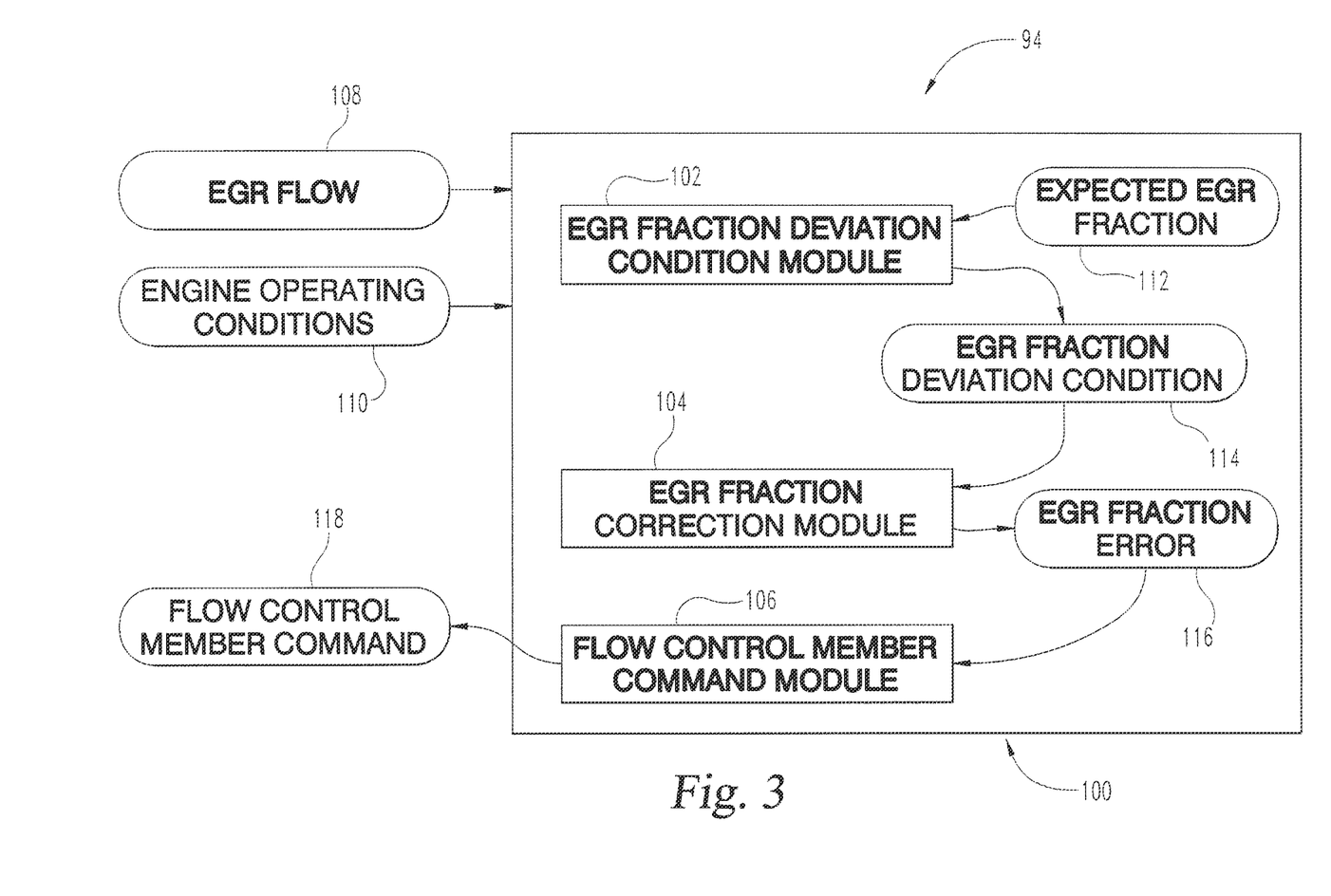
FIG. 3 is a schematic of one embodiment controller apparatus for controlling EGR flow during operation of an internal combustion engine.

Certain systems are described following, and include examples of controller operations in various contexts of the present disclosure. In certain embodiments such as shown in FIG. 3, the controller 94 includes a controller apparatus 100 with an EGR fraction deviation condition module 102 that interprets an EGR fraction deviation condition 114 in response to one or more of an EGR flow input 108 and vehicle or engine operating conditions input 110 sensed by the sensors represented by sensor 98 and a target or expected EGR fraction 112.

Controller apparatus 100 includes an EGR fraction correction module 104 that receives EGR fraction deviation condition 114 output by EGR fraction deviation condition module 102. In response to the EGR fraction deviation condition 114, EGR fraction correction module 104 determines an EGR fraction error 116. The EGR fraction error 116 is provided to a flow control member command module 106. Flow control member command module 106 determines an adjustment amount of one or more of the flow control members 86, 88, 90 to maintain, adjust, drive or correct the actual EGR fraction toward the expected EGR fraction. The adjustment, opening, or closing of flow control members 86, 88, 90 determines the distribution of EGR flow in the intake flow, and the adjustment, opening, or closing of flow control members 86, 88, 90 can further determined in response to operating conditions of engine 30. For example, in one embodiment, a first set of operating conditions may indicate EGR flow through all flow control members 86, 88, 90 provides the most desired distribution of EGR flow in the intake flow. A second set of operating conditions may indicate EGR flow through all just one or two of control members 86, 88, 90 provides the most desired distribution of EGR flow in the intake flow while the remaining flow control members are closed.

Flow control member command module 106 outputs a flow control member command 118 to an actuator connected to one or more of the flow control members 86, 88, 90 to maintain the actual EGR flow at the expected EGR fraction, to drive the actual EGR flow 108 toward the expected EGR fraction 112, or to reduce a difference between the actual EGR flow 108 and the expected EGR fraction 112 by mitigating the EGR fraction error 116 (difference between the actual and expected EGR flow.) The EGR fraction deviation condition 114 can be any condition understood in the art that may indicate that the actual EGR flow or fraction 108 deviates from the expected EGR fraction 112. The expected EGR fraction 112 indicates that portion of the total exhaust flow that is provided as EGR flow by the primary EGR cylinder(s) when all cylinders are operating in the same manner. For example, in one embodiment with multiple EGR cylinders, one of the primary EGR cylinder(s) may be deactivated by terminating fuelling to the primary EGR cylinder, while the remaining primary EGR cylinder(s) are fuelled. In this embodiment, the expected EGR fraction 112 is adjusted to account for elimination of exhaust flow from the deactivated primary EGR cylinder.

Examples of non-limiting events resulting in EGR fraction deviation conditions 114 include engine operating conditions 110 corresponding to transients such as an accelerator tip-in condition and an accelerator tip-out condition, and steady state low load conditions. An accelerator tip-in condition can result in a reduction of EGR flow 108 due to a temporary starving condition created by the lack of accumulated exhaust gas in the EGR system, causing an EGR fraction undershoot condition. An accelerator tip-out condition can result in an excess EGR flow 108 due to excess exhaust gas accumulated in the EGR system, causing an EGR fraction overshoot condition. A steady state condition low load condition can result in an excess EGR flow 108 due to internal residues in the EGR system that occur due to volumetric efficiency changes, causing an EGR fraction overshoot condition. Controller apparatus 100 is operable to interpret an EGR fraction deviation condition 114 in response to determining a deviation of an actual EGR flow 108 and from the expected EGR fraction 112, detection of an accelerator tip-in condition, detection of an accelerator tip-out condition, determining a steady state low load condition (such as less than 50% of a peak torque condition), and combinations of these or other transient conditions that indicate an EGR fraction undershoot or EGR fraction overshoot condition.

In one embodiment, controller apparatus 100 is configured to provide an EGR flow control command 118 to temporarily close one or more of the flow control members 86, 88, 90 to prevent an EGR fraction overshoot condition. In another embodiment, controller apparatus 100 is configured to provide an EGR flow control command 118 to temporarily open one or more of the flow control members 86, 88, 90 to prevent an EGR fraction undershoot condition. In a further embodiment, one or more of flow control members 86, 88, 90 is closed or partially closed during normal operating conditions to provide the expected EGR fraction 112, and can then be opened in response an EGR fraction deviation condition 114 indicating an EGR fraction undershoot to provide a temporary increase or release of EGR flow from accumulator 24.

Controller apparatus 100 is operable to interpret EGR fraction deviation conditions 114 from EGR flow 108 and/or engine operating conditions 110 and modulate EGR flow control members 86, 88, 90 to increase or decrease the amount of EGR flow released from storage volume 70 of accumulator 24 so the expected EGR fraction 112 is provided in anticipation of an EGR fraction deviation condition 114 and/or in response to an EGR fraction deviation condition 114. In this or any embodiment described herein, the actual EGR fraction or EGR flow 108 can be determined, for example, by determining the difference between the charge flow at intake manifold 28 and the fresh air intake flow upstream of mixing location 42; a direct measurement or calculation of intake flow upstream of the mixing location of EGR flow and intake flow and the combined flow downstream of the mixing location; a measurement of $O_2$ levels in the EGR conduit 44 and exhaust manifold 32; etc. The charge, intake, and/or EGR flow can be determined by a mass air flow sensor, by calculation using a speed-density approach (charge flow), or any other technique.

The disclosed EGR systems may be implemented into any engine or power system application where EGR is utilized. The disclosed EGR system provides improved distribution and control of recirculated exhaust gas in applications where fewer than all of the engine system's cylinders contribute exhaust for recirculation. Specifically, the disclosed EGR system in one embodiment stores EGR flow from each exhaust pulse of the engine's contributing cylinder(s) to provide a constant supply of EGR flow that is divided into multiple EGR flows that are substantially equally distributed within intake air that is subsequently drawn into the engine and combusted. In a further embodiment, the EGR flow from the accumulator is released in a controlled manner in response to an EGR fraction deviation condition to maintain or drive the actual EGR fraction at or toward the expected EGR fraction.

Figure 4:
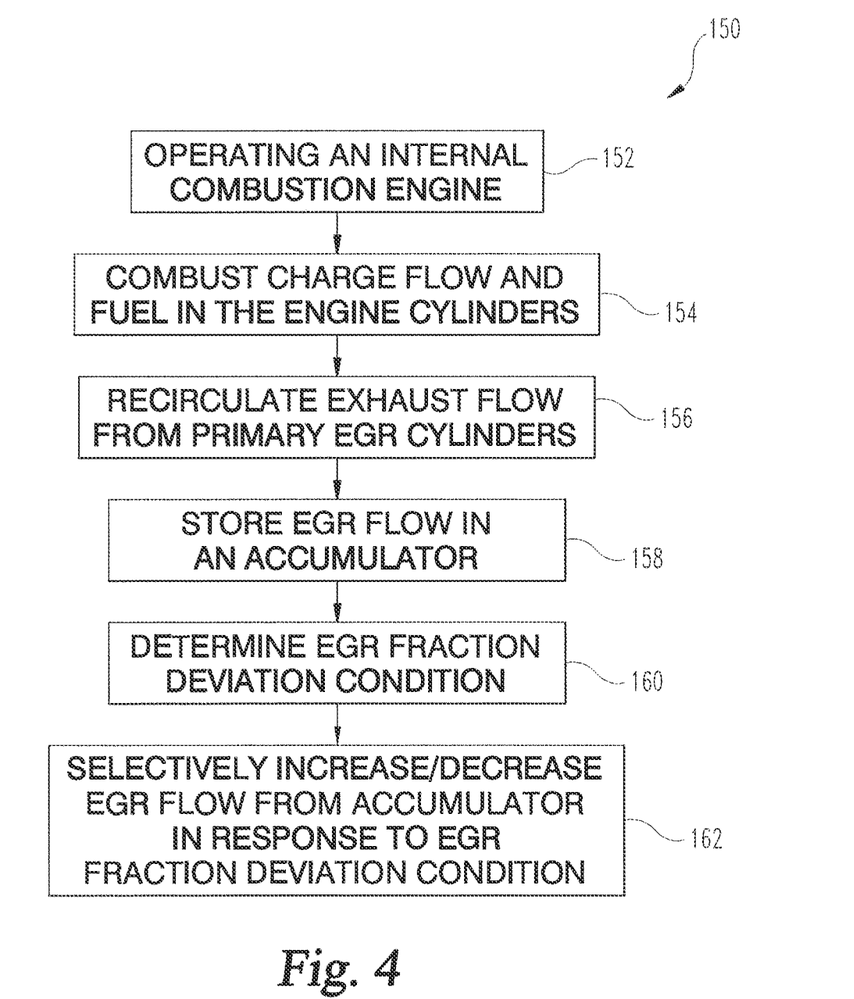
FIG. 4 is a flow diagram of a procedure for controlling EGR flow during operation of an internal combustion engine.

Referring to FIG. 4, one embodiment of a procedure for controlling the EGR flow to an internal combustion engine is shown. Procedure 150 includes an operation 152 that includes operating an internal combustion engine. Procedure 150 continues at operation 154 to combust a charge flow and fuel in the cylinders of the engine to produce an exhaust flow. At operation 156 the exhaust flow from a portion of the cylinders that are primary EGR cylinders and connected to an EGR system is recirculated to the intake system while the exhaust flow from the remaining cylinders is provided to the exhaust system for aftertreatment and outlet to atmosphere.

Procedure 150 continues at operation 158 to store the recirculated exhaust flow in an accumulator that is connected to the intake system with a plurality of outlets that each include a flow control member. At operation 160 procedure 150 includes determining an EGR fraction deviation condition in response to at least one of engine operation conditions, such as transient conditions, and a deviation of the actual EGR flow from the expected EGR flow. Procedure 150 continues at operation 162 to selectively increase or decrease the EGR flow to the intake system from the exhaust stored in the accumulator by selectively opening or closing one or more of the flow control members in response to the EGR fraction deviation condition. The flow control members control the opening size of respective ones of a plurality of outlets from the accumulator into the air intake system As is evident from the figures and text presented above, a variety of aspects are contemplated. According to one aspect, a method includes operating an engine having a plurality of cylinders; directing a charge flow into the plurality of cylinders from an air intake system; combusting a mixture of the charge flow and fuel within the plurality of cylinders to generate a power output and a flow of exhaust; directing a first portion of the flow of the exhaust from a first portion of the plurality of cylinders to an aftertreatment system; directing a second portion of the flow of the exhaust from a second portion of the plurality of cylinders to an accumulator in an EGR system connected to the air intake system. The accumulator extends between an inlet to the accumulator and a plurality of outlets connected to the air intake system, and the accumulator stores a supply of recirculated exhaust gas for release into the air intake system through the plurality of outlets. The method further includes selectively increasing or decreasing the supply of stored recirculated exhaust gas in the accumulator in response to a deviation of an EGR flow from an expected EGR fraction by controlling an opening size of one or more of the plurality of outlets into the air intake system.

In one embodiment, the method includes increasing the supply of stored recirculated exhaust gas in response to the EGR flow exceeding the expected EGR fraction. In a refinement of this embodiment, the method includes decreasing the supply of stored recirculated exhaust gas in response to the EGR flow being less than the expected EGR fraction.

In another embodiment, the accumulator includes a storage volume between the inlet and the plurality of outlets, and the storage volume is sized as a function of a total number of the plurality of cylinders contributing to the second portion of the flow of exhaust to mix with air in the air intake system.

In yet another embodiment, the second portion of the flow of the exhaust from the second portion of the plurality of cylinders is directed only to the accumulator. In a further embodiment, the plurality of outlets includes at least three outlets and each outlet includes a flow control member operable to control the opening size of the respective outlet. In a refinement of this embodiment, selectively increasing or decreasing the supply of stored recirculated exhaust gas in the accumulator in response to the deviation of the EGR flow from the expected EGR fraction includes opening first portion of the at least three outlets and closing a second portion of the at least three outlets.

In another embodiment, the deviation of the EGR flow from the expected EGR fraction is determined in response to an EGR flow determination. In yet another embodiment, the deviation of the EGR flow from the expected EGR fraction is determined by interpreting an engine operating condition corresponding to at least one of an accelerator tip-in condition, an accelerator tip-out condition, and a steady state low load condition.

According to another aspect, a system includes an engine including a plurality of cylinders, an intake passage configured to direct a charge flow to the plurality of cylinders, an exhaust passage configured to receive exhaust from a first portion of the plurality of cylinders and direct the exhaust from the first portion of the plurality of cylinders to an aftertreatment system, and an EGR system configured to receive exhaust from a second portion of the plurality of cylinders and direct the exhaust from the second portion to the intake passage. The EGR system includes an accumulator having an inlet for receiving the exhaust from the second portion of the plurality of cylinders, a plurality of outlets along the intake passage that directly connects the accumulator to the intake passage, and a storage volume between the inlet and the plurality of outlets. Each of the plurality of outlets includes a flow control member operable to selectively open and close the respective outlet to permit passage of the exhaust therethrough into the intake passage.

In one embodiment, the second portion of the plurality of cylinders provides exhaust only to the exhaust gas recirculation system. In a refinement of this embodiment, the first portion of the plurality of cylinders provides exhaust only to the aftertreatment system.

In another embodiment, each of the plurality of outlets is fluidly connected with a mixing chamber of the intake passage. In yet another embodiment, the system includes a cooler located within the EGR system and a valve located upstream of the cooler to regulate exhaust flow from the second portion of the plurality of cylinders through the EGR system. In a further embodiment, the plurality of outlets includes at least three outlets and the flow control member in each outlet is operable to control the opening size of the respective outlet.

According to another aspect, a system includes a combustion engine having a first group of cylinders and a second group of cylinders, where the first group of cylinders and the second group of cylinders each includes at least one cylinder. The system also includes an exhaust manifold configured to receive exhaust from the first group of cylinders, an aftertreatment system configured to receive exhaust from the exhaust manifold, an intake system configured to receive a fresh air flow and direct a charge flow to the first and second groups of cylinders, and an EGR system configured to receive exhaust from the second group of cylinders and provide an EGR flow to the fresh air flow in the intake system and form the charge flow. The system further includes an accumulator connecting the exhaust gas recirculation system to the intake system. The accumulator includes an inlet and a plurality of separate exhaust outlets in flow communication with the intake system, and each of the plurality of exhaust outlets includes a flow control member that is movable between an open position and a closed position to control an amount of EGR flow that is supplied to the intake system. A controller is configured to interpret an EGR fraction deviation condition in response to an EGR flow produced by the second group of cylinders deviating from an expected EGR fraction from the second group of cylinders, and the controller is further configured to move at least one of the flow control members between the open and closed positions in response to the EGR fraction deviation condition to control the amount of EGR flow to the intake system.

In one embodiment, the expected EGR fraction is a ratio of a number of cylinders in the second group to a number of cylinders in the first group. In a refinement of this embodiment, the second group of cylinders includes at least two cylinders, at least one of the cylinders in the second group is deactivated, and the number of the cylinders in the second group does not include the at least one deactivated cylinder.

In another embodiment, the controller is configured to close at least one of the flow control members in response to the EGR fraction deviation condition indicating the EGR flow exceeds the expected EGR fraction. In yet another embodiment, the controller is configured to open at least one of the flow control members in response to the EGR fraction deviation condition indicating the EGR flow is less than the expected EGR fraction. The controller can further be configured to open or close at least one other of the flow control members in response to the EGR fraction deviation condition indicating the EGR flow is less than or more than, respectively, the expected EGR fraction. In a further embodiment, the flow control members are valves that are actuated to open or close in response to an EGR flow control command from the controller. In a refinement of this embodiment, at least one of the flow control members is closed while a remaining portion of the flow control members are closed in response to the EGR flow control command.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating an engine having a plurality of cylinders;

directing a charge flow into the plurality of cylinders from an air intake system;
combusting a mixture of the charge flow and fuel within the plurality of cylinders to generate a power output and a flow of exhaust;
directing a first portion of the flow of the exhaust from a first portion of the plurality of cylinders to an aftertreatment system;
directing a second portion of the flow of the exhaust from a second portion of the plurality of cylinders to an accumulator in an exhaust gas recirculation (EGR) system connected to the air intake system, the accumulator extending between an inlet to the accumulator and a plurality of outlets connected to the air intake system, wherein the accumulator stores a supply of recirculated exhaust gas for release into the air intake system through the plurality of outlets; and
selectively increasing or decreasing the supply of stored recirculated exhaust gas in the accumulator in response to a deviation of an EGR Plow from an expected EGR fraction by controlling an opening size of one or more of the plurality of outlets into the air intake system, wherein the expected EGR fraction is ratio of a number of cylinders in the second group to a number of cylinders in the first group.

2. The method of claim 1, wherein the second portion of the flow of the exhaust from the second portion of the plurality of cylinders is directed only to the accumulator.

3. The method of claim 1, wherein the deviation of the EGR flow from the expected EGR fraction is determined in response to an EGR flow determination.

4. The method of claim 1, wherein the deviation of the EGR flow from the expected EGR fraction is determined by interpreting an engine operating condition corresponding to at least one of an accelerator tip-in condition, an accelerator tip-out condition, and a steady state low load condition.

5. The method of claim 1, further comprising increasing the supply of stored recirculated exhaust gas in response to the EGR flow exceeding the expected EGR fraction.

6. The method of claim 5, further comprising decreasing the supply of stored recirculated exhaust gas in response to the EGR flow being less than the expected EGU fraction.

7. The method of claim 1, wherein the plurality of outlets includes at least three outlets and each outlet includes a flow control member operable to control the opening size of the respective outlet.

8. The method of claim 7, wherein selectively increasing or decreasing the supply of stored recirculated exhaust gas in the accumulator in response to the deviation of the EGR flow from the expected EGR fraction includes opening first portion of the at least three outlets and closing a second portion of the at least three outlets.

9. A method, comprising:
operating an engine having a plurality of cylinders;
directing a charge flow into the plurality of cylinders from an air intake system;
combusting a mixture of the charge flow and fuel within the plurality of cylinders to generate a power output and a flow of exhaust;
directing a first portion of the flow of the exhaust from a first portion of the plurality of cylinders to an aftertreatment system;
directing a second portion of the flow of the exhaust from a second portion of the plurality of cylinders to an accumulator in an exhaust gas recirculation (EGR) system connected to the air intake system, the accumulator extending between an inlet to the accumulator and a plurality of outlets connected to the air intake system, wherein the accumulator stores a supply of recirculated exhaust gas for release into the air intake system through the plurality of outlets, wherein the accumulator includes a storage volume between the inlet and the plurality of outlets, and the storage volume is sized as a function of a total number of the plurality of cylinders contributing to the second portion of the flow of exhaust to mix with air in the air intake system; and
selectively increasing or decreasing the supply of stored recirculated exhaust gas in the accumulator in response to a deviation of an EGR flow from an expected EGR fraction by controlling an opening size of one or more of the plurality of outlets into the air intake system.

10. A system, comprising:
an engine including a plurality of cylinders;
an intake passage configured to direct a charge flow to the plurality of cylinders;
an exhaust passage configured to receive exhaust from a first portion of the plurality of cylinders and direct the exhaust from the first portion of the plurality of cylinders to an aftertreatment system; and
an exhaust gas recirculation (EGR) system configured to receive exhaust from a second portion of the plurality of cylinders and direct the exhaust from the second portion to the intake passage, wherein the EGR system includes an accumulator having an inlet for receiving the exhaust from the second portion of the plurality of cylinders, a plurality of outlets along the intake passage that directly connects the accumulator to the intake passage, and a storage volume between the inlet and the plurality of outlets, wherein each of the plurality of outlets includes a flow control member operable to selectively open and close the respective outlet to permit passage of the exhaust therethrough into the intake passage, wherein the storage volume is sized as a function of a total number of the plurality of cylinders contributing to the second portion of the flow of exhaust to mix with air in the air intake system.

11. The system of claim 10, wherein each of the plurality of outlets is fluidly connected with a mixing chamber of the intake passage.

12. The system of claim 10, further including:
a cooler located within the EGR system; and
a valve located upstream of the cooler to regulate exhaust flow from the second portion of the plurality of cylinders through the EGR system.

13. The system of claim 10, wherein the plurality of outlets includes at least three outlets and the flow control member in each outlet is operable to control the opening size of the respective outlet.

14. The system of claim 10, wherein the second portion of the plurality of cylinders provides exhaust only to the EGR system.

15. The system of claim 14, wherein the first portion of the plurality of cylinders provides exhaust only to the aftertreatment system.

16. A system, comprising:
a combustion engine having a first group of cylinders and a second group of cylinders, wherein the first group of cylinders and the second group of cylinders each includes at least one cylinder;
an exhaust manifold configured to receive exhaust from the first group of cylinders;
an aftertreatment system configured to receive exhaust from the exhaust manifold;

an intake system configured to receive a fresh air flow and direct a charge flow to the first and second groups of cylinders;

an exhaust gas recirculation (EGR) system configured to receive exhaust from the second group of cylinders and provide an EGR flow to the fresh air flow in the intake system and form the charge flow;

an accumulator connecting the exhaust gas recirculation system to the intake system, the accumulator including an inlet and a plurality of separate exhaust outlets in flow communication with the intake system, wherein each of the plurality of exhaust outlets includes a flow control member that is movable between an open position and a closed position to control an amount of EGR flow that is supplied to the intake system; and a controller configured to interpret an EGR fraction deviation condition in response to an EGR flow produced by the second group of cylinders deviating from an expected EGR fraction from the second group of cylinders, wherein the expected EGR fraction is a ratio of a number of cylinders in the second group to a number of cylinders in the first group, and further wherein the controller is further configured to move at least one of the flow control members between the open and closed positions in response to the EGR fraction deviation condition to control the amount of EGR flow to the intake system.

17. The system of claim 16, wherein the second group of cylinders includes at least two cylinders, at least one of the cylinders in the second group is deactivated, and the number of the cylinders in the second group does not include the at least one deactivated cylinder.

18. The system of claim 16, wherein the controller is configured to close at least one of the flow control members in response to the EGR fraction deviation condition indicating the EGR flow exceeds the expected EGR fraction.

19. The system of claim 16, wherein the controller is configured to open at least one of the flow control members in response to the EGR fraction deviation condition indicating the EGR flow is less than the expected EGR fraction.

20. The system of claim 16, wherein the flow control members are valves that are actuated to open or close in response to an EGR flow control command from the controller.

21. The system of claim 16, wherein the EGR flow control command closes at least one of the plurality of flow control members while a remaining portion of the plurality of flow control members are open.

* * * * *